Figure 1:
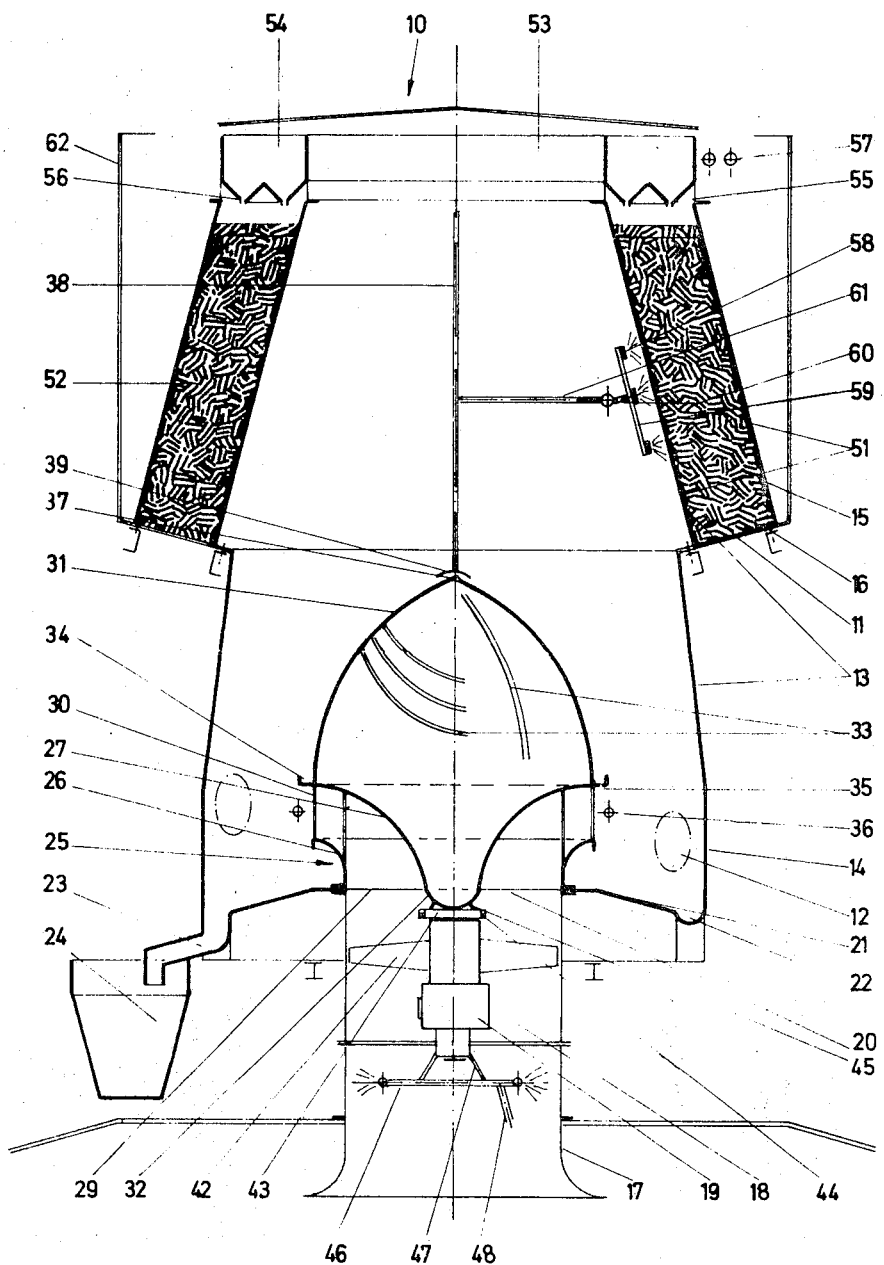

United States Patent [19]

Laube

[11] 3,777,457

[45] Dec. 11, 1973

[54] APPARATUS FOR CLEANING THE EXHAUST AIR FROM WORKSHOPS

[75] Inventor: Max Laube, Zurich, Switzerland

[73] Assignee: Swiss Aluminium Ltd., Chippis, Switzerland

[22] Filed: Jan. 17, 1972

[21] Appl. No.: 218,067

[30] Foreign Application Priority Data
Jan. 29, 1971 Switzerland.................. 1375/71

[52] U.S. Cl.................. 55/223, 55/233, 55/235, 55/259, 55/260, 261/79 A, 261/98, 261/116, 261/118
[51] Int. Cl............................................ B01d 50/00
[58] Field of Search.................. 55/90, 92, 93–95, 55/223, 233, 235–239, 259, 260; 261/79 A, 98, 116, 118

[56] References Cited
UNITED STATES PATENTS
3,526,082 9/1970 Thuiller.................. 261/79 A
3,563,004 2/1971 Schouw.................. 55/237

Primary Examiner—Bernard Nozick
Attorney—Ernest F. Marmorek

[57] ABSTRACT

An apparatus for cleaning the exhaust air from workshops, said apparatus comprising a cyclone and a filter attached to the delivery end of the cyclone, whereby within the cyclone and before a rotary movement of the exhaust air, dusty and/or gaseous constituents of the air are combined with droplets of liquid to increase the action of rotary movement for removal of these constituent from the air and further delivering the air cleaned by rotary action through a wet operated filter removing all remaining constituents from the air.

13 Claims, 5 Drawing Figures

APPARATUS FOR CLEANING THE EXHAUST AIR FROM WORKSHOPS

The present invention relates to a device for cleaning the exhaust gas containing dusty and/or gaseous constituents, from workshops, especially workshops with aluminium electolysis furnaces installed in them.

A cyclone for separation of dusty constituents from the exhaust air flowing from a workshop is known. The defect of this form of construction is, that its effectiveness depends on the speed of the flow of air prevailing in the shop, in conjunction with the size of the dust particles carried with it. The speed of the exhaust air stream is influenced by weather conditions such as air pressure and surrounding temperature of the workshop; if consideration is given to the fact that the grain size of the dust particles carried by the exhaust air stream varies from time to time, it appears that for the known cyclone there are operating conditions, during which it is ineffective for cleaning the exhaust air. In addition this cyclone only extracts from the exhaust air stream quantities of dust of a given grain size, which are proportional to the exhaust air speed in the workshop. A clean shop exhaust air stream, which should contain only a predetermined but negligible residue of dust per unit volume, which residue could possibly only be further separated from the air stream by electro filters, cannot be achieved with this form of construction. To remove the gaseous constituents contained in the exhaust air stream it is known to provide condensers. The condensers are provided between electrolysis cells and cyclone. Since the condenser is coated with a liquid layer, a crust of dust is formed which influences the efficiency of the condenser, the removal of which requires additional maintenance.

The object of the present invention is to provide a device by which the disadvantages described above are avoided, thereby that a cleaner for exhaust air from a workshop is provided comprising: a housing having an air entry at its bottom, a lower enclosing wall impermeable to air, and an upper enclosing wall permeable to air; a ring of stator blades downstream of the air entry, arranged to direct the air flow through outlet openings of the ring and in so doing to impart rotation to the air flow, a fan upstream of the ring of stator blades; means for supplying water to wet the upper enclosing wall; means for supplying water to the outlet openings of the ring of stator blades; and means for collecting dirt which has become separated from the air in the housing.

A constructional form of the device according to the invention is characterised in that, the housing part permeable to exhaust air is formed as a filter, which in one form consists of two filter baskets arranged axially after one another which surround a filter packing, which advantageously constitute a contracting truncated cone in the direction of flow of the exhaust air, while water is introduced into the filter by means of a reservoir arranged above the filter with a sawtooth shaped perforated floor, and the operation of the water supply in the construction already mentioned is capable of being increased further, in that upstream of the filter there are provided nozzles spraying the filter with water.

A constructional form for advantageously increasing the separating action of the device is characterised in that, the water supply to the ring of stator blades consists of an open or closed gutter with outlet openings arranged above the outlet openings along the circumference of the ring of stator blades which can be supplied through a water supply pipe. In this connection it can be arranged that the ring of stator blades carries a guide cone extending in the direction of flow of exhaust air, which is wettable by means of a water supply pipe for directing water in the direction towards the outlet openings, while this cone can have open distributing channels in its casing, which for example can extend along lines of the casing or obliquely thereto.

An advantageous constructional form of the ring of stator blades is characterised in that, the ring of stator blades is axially enclosed at a distance by an aerodynamically shaped pipe for bringing water into the exhaust air stream.

A constructional form of the invention is further featured, in that the fan transporting air in axial direction is arranged inside a suction pipe opening into the exhaust air entry, and between the fan and the ring of stator blades there is provided a water distributing ring for injecting water into the exhaust air stream.

Figure 2:
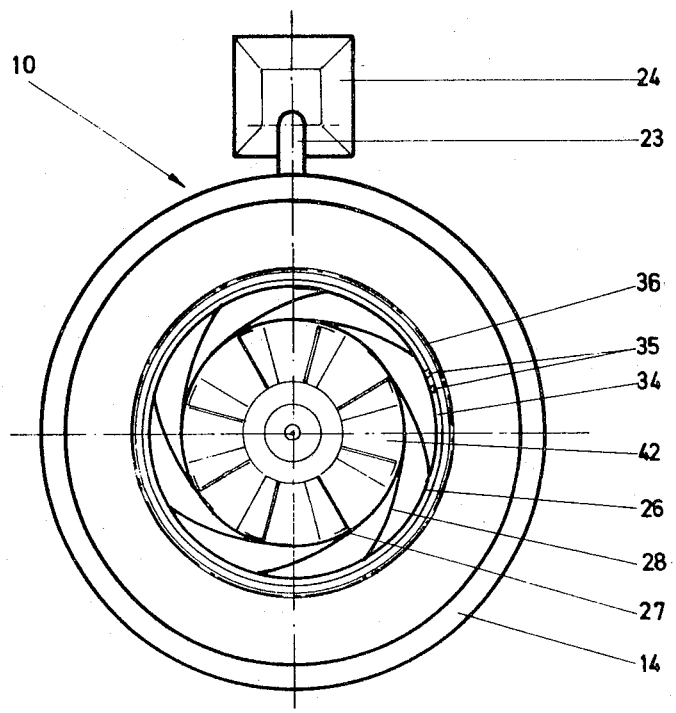
Figure 3:
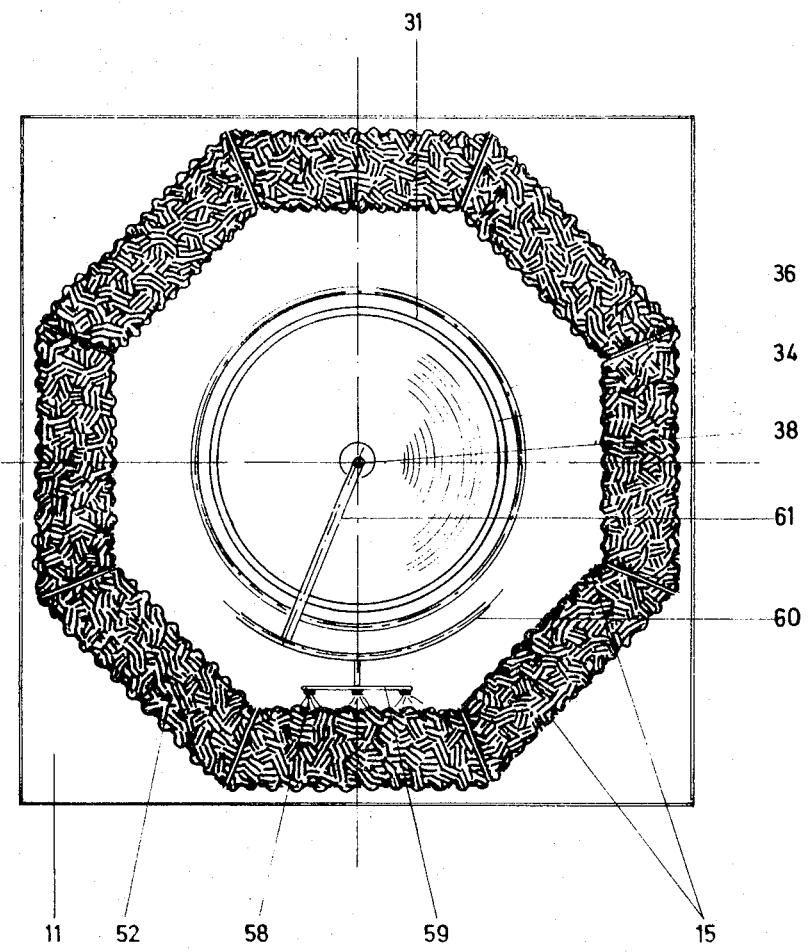
Figure 4:
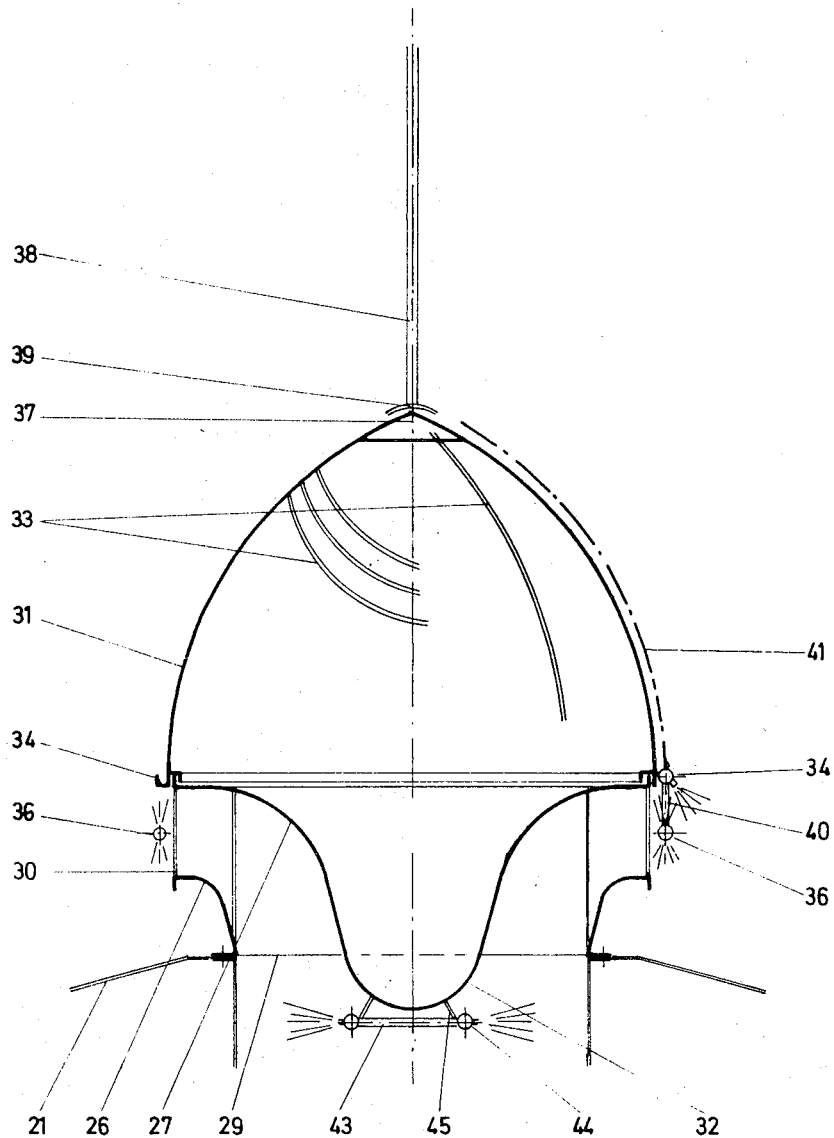
Figure 5:
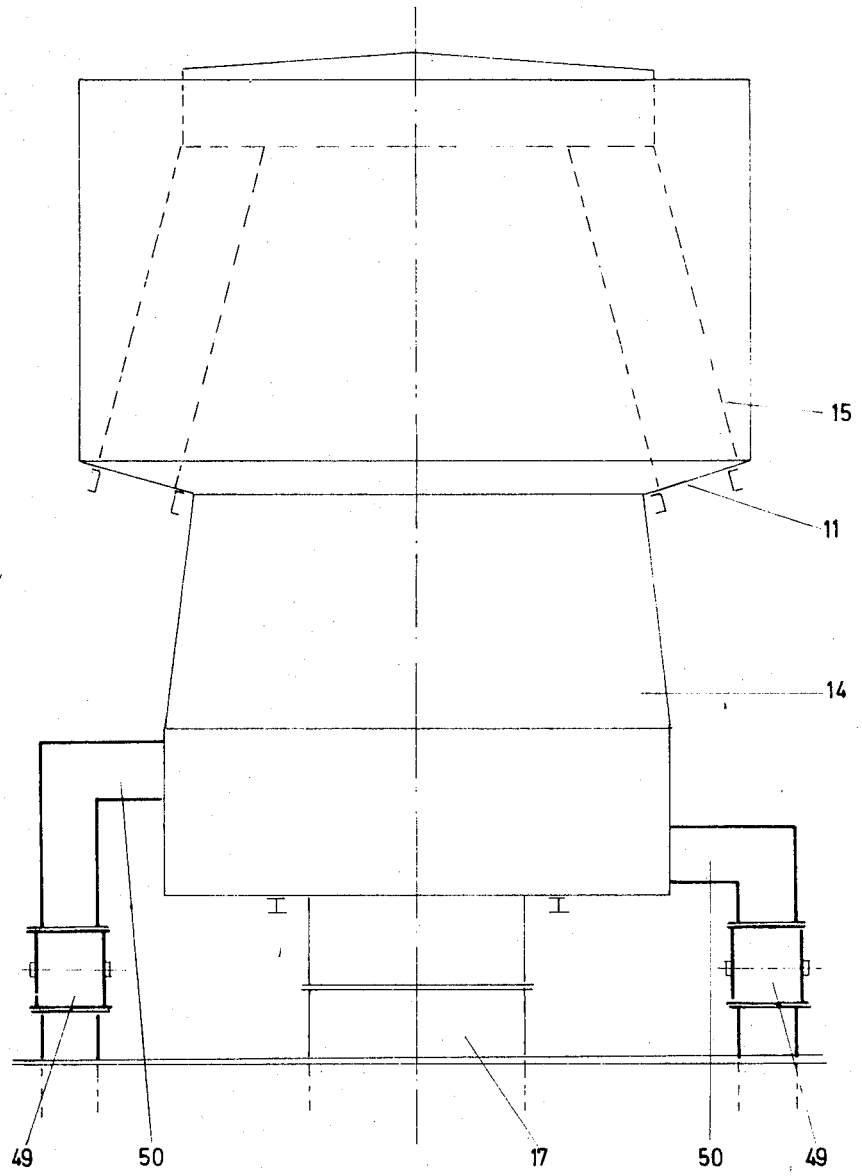

Constructional examples of the invention are shown in the drawing, and these show:

FIG. 1 a device according to the invention in vertical section;

FIG. 2 a horizontal section through the device according to FIG. 1;

FIG. 3 a further horizontal section through the device according to FIG. 1;

FIG. 4 an enlarged showing of the ring of stator blades according to FIG. 1;

FIG. 5 a further constructional form of the device according to FIG. 1.

According to FIG. 1, the separating device 10 consists of a housing part 13 which is formed by a housing part 14 impermeable to air and a housing part 15 permeable to air, which are provided following one another in the axial extent of the housing 13 and are connected together. The reference numeral 12 indicates the inlet opening of an inlet channel 50, which is mentioned in conjunction with FIG. 5. In the constructional form shown, it is a matter of a filter as the housing part 15 permeable to air. The housing part 14 impermeable to air and the air-permeable part 15 of the housing 13 are connected together through a collar 11 on the housing part 14 and by means of known fastening devices 16, as shown in FIG. 1. The housing 13 can however also consist of one part, while exit openings for exhaust air are provided at the downstream end of the housing thus rendering it permeable to air. The housing construction shown in FIG. 1 is always suitable, if the dusty components to be separated from the exhaust air exert a strong abrasion on the wall of the housing 13. It became apparent that, besides metals resistant to erosion and corrosion, polyethylene reinforced with glass fibres, or a similar plastics material, is particularly suited as material for the housing parts 14 and 15, for reinforced polyethylene exhibits a good resistance to corrosion and resistance to erosion. The upstream side of the housing 13 is closed by means of a floor or bottom 21, which is inclined in the direction towards the housing wall, and suitably extends inclined to the horizontal at about 15°. At the circumference directed towards the housing 13, the floor carries a collecting gutter 22, which in its turn is connected firmly to the housing 13. The collecting gutter opens into an outlet pipe 23, which leads to a collecting container 24. In the lower part, advantageously in the floor or bottom 21, there is made an exhaust air entrance 20 arranged concentric to the circumference of the bottom, into which a suction pipe 17 opens. Inside the suction pipe 17 there is a fan 18, which is able to be driven by a controllable electric motor 19.

A ring of stator blades 25 is surrounded by the air-impermeable housing part 14, which ring can equally consist of glass fibre reinforced plastics instead of a metal material. The ring of stator blades is formed of an inner ring 27, and an outer ring 26, the upper surface of which is curved. The rings are arranged at an axial distance relatively to one another, so that between the rings 26, 27 there results a flow channel which deflects the exhaust through about 90°. As can be seen from FIG. 2, the rings 26 and 27 are firmly connected together by stator blades 28, and the stator blades 28 are so directed, that the exhaust gas is directed substantially along a secant to the air-impermeable housing part 14, and is displaced into a rotary motion in cooperation with the latter. The end of the inner ring 27 directed towards the fan 18 carries a cap-shaped projection 32 to guide the exhaust air propelled by the axial fan 18 into the ring of stator blades 25 without eddies. By the arrangement of stator blades 28 between the rings 26, 27, the ring of stator blades 25 has entry openings 29 in its entry cross section, and has exit openings 30 in its outlet cross section which are displaced to one another by about 90°.

For aerodynamic influence on the exhaust air which is rotating and at the same time flowing in the direction towards the air-permeable housing part 15, the ring of stator blades 25 can, on its side away from the exhaust air entry 20, carry a guide cone 31, which is connected with the ring of stator blades 25 by the plug connection shown in FIG. 4.

Along the circumference of the inner ring 27, which is turned away from the exhaust air entry 20, there runs, according to FIG. 1, an open gutter 34, which delivers water through circular or slit-shaped outlet openings 35, along the ring exit openings 30, in the direction towards the sloping floor 21, so that a water curtain can be produced in front of the outlet openings 30 of the ring of stator blades. The open gutter 34 (FIG. 1) can also be formed as a closed pipe 34 (FIG. 4) with outlet openings, if for example water under pressure is to be supplied in the direction towards the floor 21. The water supply to the open-formed gutter 34 takes place according to the construction shown in FIG. 1, through a water supply pipe 38, which distributes water through a spray head 39, (FIG. 4) starting from the apex 37 of the guide cone 31 uniformly over the guide cone, which, flowing in the direction towards the ring of stator blades, pours into the open gutter 34, and from there emerges through the outlet opening 35 to form the water curtain. FIGS. 1 and 4 show other forms of the guide cone described, such that the guide cone along its casing has open channels 33 extending along the lines of the casing or obliquely therto. Thus an open channel 33 can be provided starting from the apex 37 of the guide cone 31, and extending spirally along the casing. This optional available construction of the guide cone 31 can be suitable for ensuring a uniform wetting of the guide cone 31, and thus uniform filling of the open gutter 34. If a closed pipe 34 (FIG. 4) is arranged instead of an open gutter 34 (FIG. 1, FIG. 4 left side) the supply takes place in such a way that the water supply pipe 38, in the manner shown in FIG. 4, is connected directly with the closed pipe 34 by means of the supply pipe 41. This construction of the water supply pipe 38 should be chosen both with an open gutter 34 or a closed pipe, if no guide cone 31 is mounted on the ring of stator blades 25.

FIG. 4 shows on a larger scale a pipe 36, which for example in FIG. 1 is only indicated schematically. This pipe extends at a spacing concentrically around the periphery of the ring of stator blades 25 and is according to FIG. 4 about midway in relation to the upper and lower boundary of each exit opening 30. The pipe 36 injects water through exit openings into the exhaust air emerging from the ring of stator blades 25. This pipe 36 is fed by means of a pipe 40, which, if there is a closed pipe (FIG. 4) instead of an open gutter 34 (FIG. 1) can be branched from it. If instead there is an open gutter 34 at the downstream end of the ring of stator blades 25, with a guide cone 31 mounted (FIG. 1), then the additional supply pipe 41 to the pipe 36 should be taken starting from the water supply pipe 38, and as shown beginning before the spray head 39 as indicated in FIG. 4. If a ring of stator blades 25 without a guide cone 31 appears suitable, then with the use of an open gutter 34, the supply of the pipe 36 should branch off before the entry of the water supply pipe 38 into the open gutter 34. With the same arrangement of the ring of stator blades, but with a closed pipe, the water supply described with reference to FIG. 4 for the pipe 36 can be employed. In order that this pipe 36 shall produce the least possible turbulence in the air stream, it has with advantage an aerodynamic cross section.

FIG. 4 shows an additional arrangement which can be installed for introduction of water into the flowing exhaust air. This arrangement is a water distribution ring 43 with outlet openings 44 for the water, which is connected by supports 45 with the cap-shaped projection 32 of the inner ring 26. water can be supplied to the water distribution ring 43, which according to FIG. 1 is arranged between the rotor 42 of the axial fan 18 and the cap-shaped projection 32, through a pipe branching off from the water supply pipe 38. A further possiblility of enriching the flowing exhaust air with water can consist in that a further water distribution ring 46 is provided in the suction pipe 17 (FIG. 1), which is supported by struts 47 with the housing of the electric motor 19 or on the inner wall of the suction pipe 17. Water can be supplied to the water distribution ring 46 by means of a pipe 48.

According to FIG. 5, in a device according to the invention, additional adjustable blowers 49 can be provided, which supply exhaust air each through an inlet passage 50 in the air-impermeable part 14 of the housing 13 through the inlet openings 12 in the wall of the housing part 14 which are offset relatively to one another in height. This constructional form has the advantage, that temporarily increasing amounts of exhaust air can be coped with, which are greater than the maximum delivery performance fo the axial fan 18.

FIGS. 1 and 3 show the air-permeable housing part 15 formed as a filter. The filter is preferably made octagonal, and is assembled out of two filter baskets 51, arranged axially and separated from one another, which enclose a filter packing 52. the filter packing 52 consists of cylindrical filling rings with or without dividing wall, saddle bodies or other packing material the size of which should be adjusted to the performance of the axial fan 18, and in the case of the construction according to FIG. 5, to the performance of the axial fan 18 and the blowers 49. To increase the surface of the filter baskets 51, these are made wave-shaped (FIG. 3). The filter baskets are provided with openings, through which the exhaust air can flow into the filter packing 52 and out to the surroundings. According to the constructional form shown, the filter baskets 51 with the filter packing held by them, form a truncated cone which contracts in the direction of flow of the exhaust air, which is closed by a gas-tight cover 53.

Adjacent to the gas-tight cover 53 is a water supply 54 for the air-permeable housing part 15 in the form of the filter shown, which is constructed as a ring-shaped reservoir, with, towards the filter packing 52, a saw-tooth shaped perforated floor 55 with outlet openings 56, which releases water into the filter packing 52. A water supply pipe 57 supplies water to the reservoir. In front of the inner filter baskets 51 there are arranged spray nozzles 58, which wet with water the surface of the inner filter basket 51 turned towards the spray nozzles. The spray nozzles 58 are fixed to pipes 59, which in turn are connected to a ring pipe 60, while the ring pipe 60 can be supplied by a branch pipe 61 from the water supply pipe 38. The device works as follows:

Exahust air is sucked out of a workshop by the axial fan 18 and delivered to the ring of stator blades 25, which deflects the exhaust air stream through about 90° and so delivers it by means of the blades 28 into the air-impermeable housing part 14 of the housing 13 that it is brought into rotary motion therein. By the continuous delivery from the axial fan 18, the exhaust air rotating in the air-impermeable housing part 14 experiences a thrust directed in the direction of delivery of the axial fan 18, so that the exhaust air, while rotating, rises in the direction towards the filter. By the rotary motion of the exhaust air, a centrifugal force acts on the dusty components contained in the exhaust air, which carries the dusty components down to a certain size out of the rotating exhaust air stream to the moistened wall of the air-impermeable housing part 14, from which they are washed away into the collecting gutter 22.

With dust particles the mass of which is too small to be removed from the exhaust air stream by centrifugal force, there takes place an increase of mass by accumulation on water drops. Likewise gaseous constituents are captured by water drops for removal. For this purpose, the exhaust air is led through the water curtain flowing in front of the exit openings 30, so that a "bubbling" layer of water drops is produced. The dust particles of smaller mass are captured by the water drops, which increase their mass, so that they are carried to the wall of the housing part 14 impermeable to exhaust air, where they impinge and are washed away. Simultaneously there takes place a capture of the gaseous constituents of the exhaust air by water drops, which, when their mass is sufficient, impinge on the wall of the housing part 14 and run in the direction of the collecting gutter 22. The water drops whose mass is not sufficient to be carried to this wall, and the drops with accumulated dust particles and dissolved gaseous constituents, the mass of which is not enough for carriage to the housing part 14, rise axially while rotating in the cyclone, while through the residence time of the exhaust air in the cyclone which is thereby enforced, an effective disolution of the gaseous remaining constituents takes place in the water. The exhaust air which has been prepared in this way is driven into the filter, where the water drops in the exhaust air stream settle. The filter is continuously flowed through by water from the water supply 54, which washes out the liquid settled in the filter and solid constituents of the exhaust air stream, continuously cleaning the filter. The water, to which according to the invention can be added detergents for dissolving constituents walls of the housing parts 14, 15, thus washing them, to the collecting gutter 22 and from there through the outlet pipe 23 to the collecting container 24. To support the self-cleaning of the filter, the spray nozzles 58 can also be put into action. To increase the effectiveness of the wet operation, the pipe 36 alone or in connection with the water distribution ring 43 can be set in operation, for further enriching the exhaust air stream with water. The truncated conical shaped formation of the filter hinders the lower end of the inner filter basket running dry. The water penetrating vertically through the filter from the reservoir is, after emergence from the inner filter basket 51, urged against the surface of the inner filter basket by the flow of exhaust air which is rotating in this housing part and being pushed axially and thus flowing through the filter, so that the filter is continuously wetted in its axial extent. The angle of inclination of the filter baskets depends on the water and gas loading. In order that wind pressure and wind speeds should not influence the mode of operation of the device, a wind shield casing 62 is provided around the part 15 permeable to exhaust air, against which the delivered exhaust air flows, so as then to flow vertically upwards.

Instead of, or in combination with, detergents, according to the invention solutions of alkalis, e.g. soda liquor, can also be added to the fresh water, while a constant pH value can be maintained in the circulating water, which is adjusted to the best value for the process.

I claim:

1. A cleaner for exhaust air from a workshop, comprising: a housing having an air entry at its bottom, a lower enclosing wall impermeable to air, and an upper enclosing wall permeable to air;
   a ring of stator blades downstream of the air entry, arranged to direct the air flow through outlet openings of the ring and in so doing to impart rotation to the air flow;
   a fan upstream of the ring of stator blades;
   means for supplying water to wet the upper enclosing wall;
   means for supplying water to the outlet openings of the ring;
   and means for collecting dirt which has become separated from the air in the housing.

2. Device according to claim 1, characterised in that the fan is an axial fan and is arranged inside suction pipe opening into the exhaust air entry, and between the axial fan and the ring of stator blades there is provided a water distributing ring for injecting water into the exhaust air stream.

3. Device according to claim 1, characterised in that the air-permeable housing part is formed as a filter.

4. Device according to claim 3, characterised in that the filter, formed octagonal in cross section, consists of two filter baskets arranged axially after one another, and holding in between a filter packing.

5. Device according to claim 4, characterised in that the filter baskets constitute a contracting truncated cone in the direction of flow of the exhaust air.

6. Device according to claim 3, characterised in that the water supply is arranged above the filter and is formed as a reservoir delivering into the filter with a saw-tooth shaped perforated floor.

7. Device according to claim 6, characterised in that, nozzles are provided spraying the upstream surface of the inner filter basket.

8. Device according to claim 1, characterised in that the water supply to the ring of stator blades consists of an open or closed gutter with outlet openings arranged above exit openings whereby said gutter is provided along the circumference of the ring of stator blades.

9. Device according to claim 8, characterised in that the ring of stator blades carries a guide cone extending in the direction of flow of exhaust air, which is wettable by means of a water supply pipe for directing water in the direction towards the outlet openings.

10. Device according to claim 9, characterised in that open channels are provided on the guide cone.

11. Device according to claim 9, characterised in that along the guide cone, starting from the apex of the guide cone, a spirally extending open channel is provided.

12. Device according to claim 8, characterised in that the ring of stator blades is axially enclosed at a distance by a pipe for bringing water into the exhaust air stream.

13. Device according to claim 12, characterised in that upstream of the axial fan, in the direction of flow of exhaust air, a water distributing ring is provided.

* * * * *